United States Patent Office 3,431,190
Patented Mar. 4, 1969

3,431,190
PHOTOCHEMICAL CYCLOADDITION
REACTION PROCESS
Leon Starr, Plainfield, N.J., assignor to Mobil Oil
Corporation, a corporation of New York
No Drawing. Filed June 24, 1965, Ser. No. 466,802
U.S. Cl. 204—162                                14 Claims
Int. Cl. B01j 1/10, 1/00; C07c 3/24

ABSTRACT OF THE DISCLOSURE

Increased yields in photochemical syntheses photosensitized with benzophenone are obtained by the use of a second photosensitizer. The second photosensitizer and the amount used per mole benzophenone is 1–3 moles acetone, 0.7–3.5 moles acetophenone, or 1.3–3 moles 1,3,5-triacetylbenzene.

---

The present invention relates to an improved photochemical reaction process, and more specifically to a photochemical reaction process in which an improved reaction yield is obtained by using a mixture of photosensitizers.

As is well known in the art, various photochemical reactions are carried out with the use of a photosensitizer, i.e., a substance which will absorb light energy and transfer to a substrate at least a portion of that energy in a form which will induce an otherwise unobtainable or more difficult reaction of the substrate, and generally without any substantial reduction of the ability of the substance to act as a photosensitizer. Photosensitizers differ in the efficiency with which they absorb light of a given wavelength and/or the efficiency with which they transfer that light to a given substrate in a form which will induce a desired reaction of the substrate.

Most commonly used photosensitizers absorb light of appropriate wavelength with such high efficiency that a very low concentration of such a photosensitizer in a reaction mixture will in most cases absorb substantially all of such light that is directed into the mixture. In fact, further increases in the concentration of photosensitizer in the mixture often decrease the rate of reaction by increasing the proportion of photosensitizer molecules which collide with and de-energize other like molecules.

However, and despite the high light-absorption efficiencies of such photosensitizers, many photochemical reaction processes provide product yields which are very low in relation to the yields theoretically obtainable with the amount of light energy required for their preparation. In many instances, over-all process efficiency is so low that power requirements make the process commercially impractical. Consequently, photochemical reaction process improvements which will provide even a small increase in the reaction yield per unit of expended power are highly desirable.

Many different factors have been investigated in attempts to improve the efficiency of photochemical reaction processes. However, it has heretofore appeared that process efficiency improvement should not be expected from the use of a mixture of photosensitizers because the several photosensitizers which are useful in a given photochemical reaction are generally sufficiently similar in their light-absorption characteristics that they compete for the most useful available light. Such competition results in that light being shared between several photosensitizers having different degrees of efficiency in transferring the absorbed light to the substrate, whereby the efficiency of the mixture in transferring light to the substrate in a reaction-inducing form would be less than that obtainable with use of the single photosensitizer which is most efficient in transferring absorbed light to the substrate. These expectations have been substantiated by the consistent failure of previously-tried mixtures of known photosensitizers to improve reaction yields, as will be more specifically illustrated hereinafter.

However, it has now been found that, contrary to such prior expectations, certain mixtures of known photosensitizers are capable of providing improvements in photochemical reaction process yields. Thus, in accordance with the present invention, the yield of a photochemical reaction process in which a reaction mixture containing benzophenone is induced to react by exposure of the benzophenone to light having a wavelength suitable for photosensitization of the benzophenone can be improved by carrying out the process with the reaction mixture containing a second photosensitizer selected from the group consisting of from about 1 to about 3 moles of acetone per mole of benzophenone, from about 0.7 to about 3.5 moles of acetophenone per mole of benzophenone, and from about 1.3 to about 3 moles of 1,3,5-triacetylbenzene per mole of benzophenone.

The present invention is applicable to many processes involving photochemical reactions which can be affected, e.g. initiated and/or accelerated, by the presence of photosensitized benzophenone. Generally, benzophenone is photosensitized for such purposes by exposure to ultraviolet and/or visible light, i.e., light having a wavelength between about 200 and about 760 millimicrons, and preferably ultraviolet light having a wavelength between about 300 and about 400 millimicrons. The invention is particularly applicable to photosensitized cycloaddition reactions such as those involving maleic acid anhydride or a derivative thereof, e.g. the photochemical reaction of maleic anhydride and benzene or o-xylene, chloromaleic anhydride and benzene, the cycloaddition of maleic anhydride to itself, etc. In another preferred embodiment of the invention, the benzophenone is present in the reaction mixture in a concentration between about 0.03 and about 0.15 mole per liter.

In the photochemical addition of maleic anhydride to benzene, to which the invention is especially well suited, light having a wavelength between about 320 and about 400 millimicrons is absorbed by any of a variety of photosensitizers contained in a substrate of maleic anhydride dissolved in benzene. Transmission of the absorbed light to the substrate induces a cycloaddition reaction of the benzene and maleic anhydride, resulting in formation of a normally solid benzene-maleic dianhydride product which has the structural formula:

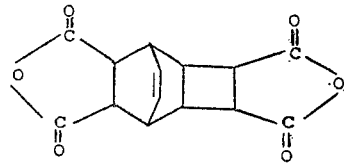

and which is useful in the preparation of thermally stable films.

In a specific embodiment, the process for the photochemical cycloaddition of maleic anhydride and benzene is carried out continuously, for example by circulating a reaction mixture containing maleic anhydride and at least one photosensitizer dissolved in benzene through the annular channel of a hollow glass reaction vessel, in which the mixture is exposed at an approximately ambient temperature (e.g. 15° to 40° C., preferably about 25° C.) to continuous irradiation emitted by a fluorescent black light bulb disposed longitudinally within the hollow center of the reaction vessel. In such a specific embodiment, the annular channel through which the reaction mixture flows is generally very narrow, e.g. about 5 millimeters, and the bulb can be of a commercially available variety, e.g. a GE 40-watt bulb which emits 8.1 watts (about 20% of its power) in the form of ultraviolet light having wavelengths between 320 and 400 millimicrons. Following irradiation, the mixture can be conducted through a settling tank, in which dianhydride product can be precipitated from the mixture, and then recirculated through the reaction vessel for further irradiation, generally after addition of a make-up stream of fresh reactants.

In another specific embodiment, the cycloaddition of maleic anhydride and benzene is carried out as a batch operation, for example by irradiating a reaction mixture containing a benzene solution of maleic anhydride (e.g. in a concentration af about 1.0 mole per liter) and at least one photosensitizer. The irradiation is generally carried out in a glass reaction vessel, generally at an approximately ambient temperature (e.g. between about 15° and about 40° C., preferably about 25° C.) and usually with an ultraviolet lamp enclosed in a Pyrex immersion well within or adjacent to the reaction vessel.

Various compounds have been found capable of photosensitizing cycloaddition reactions such as the aforedescribed benzene-maleic anhydride reaction. These compounds include, for example, benzophenone, propiophenone, acetophenone, xanthone, acetone, 1,3,5-triacetylbenzene, isobutyrophenone, p-hydroxybenzophenone, anthraquinone, ethylpyruvate and p-diacetylbenzene. Of the foregoing compounds, benzophenone has been found to be the most efficient single photosensitizer for use in various photochemical cycloaddition processes, e.g. in the cycloaddition of maleic anhydride to benzene by conventional processes such as those described hereinbefore.

Since benzophenone is highly efficient in absorbing ultraviolet light of the type most advantageously used in the aforedescribed photochemical reaction processes, and since an excess of photosensitizer in a reaction mixture can decrease the reaction yield, as explained hereinbefore, the yield obtained with benzophenone is generally maximized, e.g. in photochemical cycloaddition processes of the types described hereinbefore, by use of a concentration of only about 0.03 to about 0.15 mole of benzophenone per liter of reaction mixture. A concentration of about 0.1 mole of benzophenone per liter of reaction mixture is exemplary of the concentrations useful in maximizing reaction yield since in general, no other concentration of benzophenone within the range of about 0.03 to about 0.15 mole per liter of reaction mixture will provide a higher reaction yield, and concentrations outside that range generally provide lower yields of reaction product.

Other photosensitizers of cycloaddition reactions similarly provide a maximum reaction yield when used in relatively low concentrations. For example, the maximum yield obtainable with the use of acetone, acetophenone or 1,3,5-triacetylbenzene as the only photosensitizer in a photochemical cycloaddition reaction of the type described hereinbefore, e.g. the photochemical addition of maleic anhydride to benzene, is obtained when the process is carried out with a concentration of between 0.1 and 0.5 mole of acetone, between 0.1 and 0.15 mole of acetophenone, or between 0.1 and 0.25 mole of 1,3,5-triacetylbenzene per liter of the reaction mixture. As with benzophenone, a concentration of about 0.1 mole of acetone, acetophenone or 1,3,5-triacetylbenzene is exemplary of the concentration of each which will maximize the reaction yield for that specific photosensitizer, since no other concentration of any of those photosensitizers within the foregoing respectively described ranges will provide a higher reaction yield, and concentrations outside those ranges provide lower yields of reaction product.

As pointed out hereinbefore, various photosensitizers have been tried in mixtures of various relative concentrations in unsuccessful attempts to improve the yields obtained from photochemical cycloaddition reactions. For example, mixtures of benzophenone and each of the aforementioned photosensitizers have been tried in the aforedescribed batch process for cycloaddition of maleic anhydride to benzene. More specifically, such tests have been carried out in a glass reaction vessel containing benzophenone, a second photosensitizer, and 1.0 mole per liter of maleic anhydride dissolved in benzene. The reaction mixture was maintained at 25° C. during irradiation with a 450-watt Hannovia high pressure mercury vapor lamp which emitted 48 watts of its power as ultraviolet light having wavelengths between 320 and 400 millimicrons and which was enclosed within a Pyrex immersion well. In nearly all cases, the tested photosensitizer mixtures provided reaction yields which were, as expected for the reasons outlined hereinbefore, lower than the yield obtained when benzophenone was the only photosensitizer and all other process conditions, including reaction temperature, irradiation time, etc., were the same.

The following table illustrates the large number and diversity of the photosensitizer mixtures which were tried in unsuccessful attempts to improve the reaction yield over that obtainable with benzophenone alone. Each of the photosensitizers listed in the table was used in the concentration(s) shown, together with 0.1 mole of benzophenone per liter of reaction mixture. The results obtained with each mixture are expressed in the table in terms of the ratio between the weight of product obtained therewith and the weight of product yielded by use of the same number of kilowatt-hours of expended power under conditions which were the same except that 0.1 mole per liter of benzophenone was used as the only photosensitizer in the reaction mixture.

BENZENE-MALEIC ANHYDRIDE CYCLOADDITION REACTION YIELDS OBTAINED WITH MIXTURES OF VARIOUS PHOTOSENSITIZERS WITH 0.1 MOLE OF BENZOPHENONE PER LITER OF REACTION MIXTURE

| Photosensitizer used with benzophenone | Concentration of photosensitizer used with benzophenone, mole/liter of reaction mixture | Product weight relative to yield obtained when only 0.1 mole/liter of benzophenone was used |
| --- | --- | --- |
| None | | 1.00 |
| Acetone | 0.08 | 0.80 |
| Do | 0.85 | 0.75 |
| Acetophenone | 0.05 | 0.90 |
| Do | 0.55 | 0.88 |
| 1,3,5-triacetylbenzene | 0.10 | 0.80 |
| p-Diacetylbenzene | 0.10 | 0.92 |
| Do | 0.13 | 0.80 |
| Xanthone | 0.002 | 0.50 |
| Do | 0.10 | 0.72 |
| Propiophenone | 0.06 | 0.80 |
| Do | 0.10 | 0.85 |
| Do | 0.60 | 0.60 |
| Isobutyrophenone | 0.10 | 0.88 |
| Do | 0.30 | 0.54 |
| p-Hydroxybenzophenone | 0.10 | 0.75 |
| Ethylpyruvate | 0.10 | 0.90 |
| Anthraquinone | 0.014 | 0.90 |

It can be readily seen from the foregoing that mixtures of benzophenone and a great variety of known photosensitizers in various concentrations failed to improve the reaction yield over that obtained with only benzophenone. The following examples, however, illustrate the use of photosensitizer mixtures of the types which have been unexpectedly found to provide a reaction yield greater than that obtained with only benzophenone. It will be understood that the invention is not limited to the specific photochemical reaction, process conditions or photosensitizer ratios used therein, but that other process conditions and equipment and other ratios of such photosensitizers can be used in the same photochemical reaction or in other photosensitized reactions, as those skilled in the art will readily appreciate.

Example I

A solution of 1.0 mole per liter of maleic anhydride and 0.1 mole per liter of benzophenone in 125 milliliters of benzene was irradiated under the conditions used in the aforedescribed unsuccessful attempts to improve reaction yields by the use of mixtures of photosensitizers. That is, the solution was charged to a glass reaction vessel and maintained at 25° C. while it was irradiated by a 450-watt Hannovia high pressure mercury vapor lamp which emitted 48 watts of its power as ultraviolet light having wavelengths between 320 and 400 millimicrons and which was enclosed within a Pyrex immersion well. Ten hours of continuous irradiation resulted in the production of 1.0 gram of the aforedescribed benzene-maleic dianhydride adduct. When the process was repeated with the solution additionally containing 0.1 mole per liter of acetone, ten hours of the same type of irradiation resulted in the production of 1.25 grams of the dianhydride product (a yield of 1.25 times as great as that obtained with the same amount of expended power in the run using only benzophenone as the photosensitizer).

Example II

The procedure of Example I was repeated with a solution of 1.0 mole per liter of maleic anhydride, 0.1 mole per liter of benzophenone and 0.1 mole per liter of acetophenone in 125 milliliters of benzene. Ten hours of irradiation resulted in the production of 1.10 grams of the dianhydride product (a yield 1.10 times as great as that obtained with the same amount of expended power in the run using only benzophenone as the photosensitizer).

Example III

The procedure of Example I was repeated again with a solution of 1.0 mole per liter of maleic anhydride, 0.1 mole per liter of benzophenone and 0.145 mole per liter of 1,3,5-triacetylbenzene in 125 milliliters of benzene. Ten hours of irradiation resulted in the production of 1.10 grams of the dianhydride product (a yield 1.10 times as great as that obtained with the same amount of expended power in the run using only benzophenone as the photosensitizer).

It will be apparent from the foregoing that photosensitizer mixtures of the types utilized in Examples I–III provide photochemical reaction yields significantly greater than can be obtained with any concentration of either of the constituents of such photosensitizer mixtures, and that such improved yields are unexpected in view of the inability of many other similar photosensitizer mixtures to provide such yield improvements, or even yields as great as those obtainable when only benzophenone is used as the photosensitizer.

Although the present invention has been described with preferred embodiments, it should be understood that modifications and variations thereof may be employed without departing from the spirit and scope of this invention, as those skilled in the art will readily understand. Such variations and modifications are therefore considered to be within the purview and scope of the appended claims.

I claim:

1. In a photochemical reaction process in which a reaction mixture containing benzophenone is induced to react by exposure of the mixture to light having a wavelength suitable for photosensitization of the benzophenone, the improvement which comprises carrying out said process with the reaction mixture containing a second photosensitizer selected from the group consisting of from about 1 to about 3 moles of acetone per mole of benzophenone, from about 0.7 to about 3.5 moles of acetophenone per mole of benzophenone, and from about 1.3 to about 3 moles of 1,3,5-triacetylbenzene per mole of benzophenone.

2. A process, as defined in claim 1, in which said process comprises a photochemical cycloaddition reaction.

3. A process, as defined in claim 1, in which said process comprises the cycloaddition of maleic anhydride and an aromatic hydrocarbon.

4. A process, as defined in claim 1, in which said process comprises the cycloaddition of maleic anhydride and benzene.

5. A process, as defined in claim 1, in which the wavelength of said light is between about 200 and about 760 millimicrons.

6. A process, as defined in claim 1, in which the wavelength of said light is between about 300 and about 400 millimicrons.

7. A process, as defined in claim 1, in which the concentration of benzophenone in the reaction mixture is between about 0.03 and about 0.15 mole per liter of reaction mixture.

8. A process, as defined in claim 1, in which the concentration of benzophenone in the reaction mixture is about 0.1 mole per liter of reaction mixture.

9. A process, as defined in claim 1, in which said reaction mixture contains acetone in a concentration of about 0.1 mole per liter of reaction mixture.

10. A process, as defined in claim 1, in which said reaction mixture contains acetophenone in a concentration of about 0.1 mole per liter of reaction mixture.

11. A process, as defined in claim 1, in which said reaction mixture contains 1,3,5-triacetylbenzene in a concentration of about 0.145 mole per liter of reaction mixture.

12. A process for the photochemical cycloaddition of maleic anhydride and benzene, which comprises irradiating a benzene solution containing about 1 mole of maleic anhydride, about 0.1 mole of benzophenone and about 0.1 mole of acetone per liter of said solution with light having a wavelength between about 300 and about 400 millimicrons.

13. A process for the photochemical cycloaddition of maleic anhydride and benzene, which comprises irradiating a benzene solution containing about 1 mole of maleic anhydride, about 0.1 mole of benzophenone and about 0.1 mole of acetophenone per liter of said solution with light having a wavelength between about 300 and about 400 millimicrons.

14. A process for the photochemical cycloaddition of maleic anhydride and benzene, which comprises irradiating a benzene solution containing about 1 mole of maleic anhydride, about 0.1 mole of benzophenone and about 0.145 mole of 1,3,5-triacetylbenzene per liter of said solution with light having a wavelength between about 300 and about 400 millimicrons.

References Cited

UNITED STATES PATENTS 2,411,983  12/1946  Vaughan et al. _____ 204—162
3,257,418  6/1966   Vermont _____ 204—158 X

OTHER REFERENCES

Angew. Chem. Internat'l Ed., vol. 2 (1963), No. 12, p. 743.

HOWARD S. WILLIAMS, Primary Examiner.

U.S. Cl. X.R.
204—158